though the plant has not been completely
United States Patent Office 3,447,919
Patented June 3, 1969

3,447,919
METHOD OF FACILITATING HARVEST OF MATURE PLANTS
Donald C. Young, Fullerton, Calif., assignor to Union Oil Company of California, Los Angeles, Calif., a corporation of California
No Drawing. Filed Dec. 28, 1964, Ser. No. 421,718
Int. Cl. A01n *13/00, 9/20, 5/00*
U.S. Cl. 71—69        7 Claims

ABSTRACT OF THE DISCLOSURE

The invention comprises the application of ammonium salt solutions containing from 5 to 50 weight percent of foramide and derivatives thereof, to mature plants. The application of these solutions at concentrations containing at least about 15 weight percent of the ammonium salt results in desiccation and defoliation of the plant thereby rendering it more suitable for harvesting. The solutions are applied at dosages from about 35 to 250 pounds per acre and defoliation and desiccation results within about 24 hours. Suitable ammonium salts for use in combination with the formamide are the chloride, sulfate and nitrate and the most preferred material is the nitrate.

---

This invention relates to defoliation and desiccation of grown plants as an aid to harvesting the crop of said plants by providing a premature leaf abscission and/or necrosis.

This invention comprises the use of various intensifiers together with concentrated aqueous solutions of ammonium salts, particularly the sulfate, nitrate, chloride and mixtures thereof and the application of the mixture to the grown plant in dosages of about 35 to about 250 pounds per acre.

In addition to securing the desired plant regulatory and phytotoxic effect, the ammonium salts are plant nutrients and serve to enrich the soil for subsequent crops.

Ammonium salt solutions have been previously suggested for use as defoliants and desiccants; in particular see U.S. Patent Number 3,152,879 in which the use of the ammonium salts alone or in combination with a surface active agent is disclosed and claimed as defoliants and desiccants. While the use of the aforementioned ammonium salt solutions is quite satisfactory under most circumstances, I have now found that the action of the ammonium salt solutions can be intensified and made more consistent by the incorporation of formamide and derivatives thereof in the ammonium nitrate solution.

The use of the ammonium nitrate solutions as combined defoliants and desiccants has resulted from the recent advances in harvesting machinery, particularly improvements in cotton ginning, which have achieved satisfactory crop harvesting when the plant leaves have been desiccated even though the plant has not been completely defoliated. The application of the concentrated solutions effects defoliation of some of the plant leaves and desiccation of any remaining leaves on the plant. Additionally, the use of intrinsically toxic materials such as pentachlorophenol and magnesium chlorate has fallen into disfavor because of the residual toxic effects on aminals and on subsequent plantings.

It is an object of this invention to provide a method to satisfactorily desiccate leaves of growing plants to facilitate harvest of the plant. It is also an object of this invention to obtain a high degree of defoliation in combination with said desiccation.

It is a further object of this invention to provide a harmless composition having little or no residual toxic effects with such defoliation.

Other and related objects will be apparent from the following disclosure.

I have now found that the aforementioned objectives can be achieved by the addition of formamide and derivatives thereof to the ammonium nitrate and the application of the admixture to growing plants. The presence of the amide intensifies the reaction of the ammonium salt in the defoliation and desiccation of the plant leaves and also achieves a more consistent behavior of the salt solution.

In general, compositions having from about 5 to about 50 weight percent of the amide can be prepared simply by admixing the amide with the ammonium nitrate. Preferably from about 10 to about 25 weight percent of the amide is employed.

Formamides and substituted formamides having the following general formula are suitable for use in the invention:

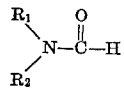

where the total of the carbon atoms in the $R_1$ and $R_2$ groups does not exceed about 10 and $R_1$ and $R_2$ are each selected from the group consisting of hydrogen, alkyl and phenyl radicals.

Examples of suitable compounds are: formamide, N-methylformamide, N,N-dimethylformamide, N-propylformamide, N-ethylformamide, N,N-diethylformamide, N,N-diphenylformamide, N,N-diisopropylformamide, N-phenyl N-methylformamide, N-amylformamide, N,N-dioctylformamide, N-decylformamide, etc.

The ammonium salt solutions useful in my invention are ammonium nitrate, ammonium sulfate, ammonium chloride and mixtures thereof. Solutions having a concentration of at least 15 weight percent solute can be used. The maximum concentration is not particularly limiting and even supersaturated solutions that contain suspended solute crystals can be used, it only being important that there be sufficient liquid to adequately distribute the salt on the plant leaves. Generally, solutions or slurries containing from about 15 to about 80 weight percent solute are used with a maximum solids content of the slurries of about 20 weight percent. Preferably, however, the maximum solute content is the salting out concentration of the solution at the ambient temperature to avoid any difficulties in handling a slurry. This concentration is about 65 weight percent ammonium nitrate, 55 weight percent ammonium sulfate and about 30 weight percent ammonium chloride. The choice of the solution concentration will depend somewhat on the method of application, the most concentrated solutions from about 30 to 80 weight percent being preferred for aerial application where the airplane's capacity generally limits the total volume of solution applied per acre to less than about 15 gallons per acre and frequently to less than 10 gallons per acre. The commercial ground rigs do not have this limited spray capacity and therefore even the more dilute solutions can be effectively applied by these rigs.

The combination of ammonium chloride and nitrate, ammonium sulfate and nitrate or ammonium sulfate, nitrate and chloride can also be used. Thus about 5 to 25 weight percent ammonium chloride and/or ammonium sulfate can be added to the commercially available "20–0–0" ammonium nitrate solution (57 weight percent solute) to provide mixed salt solutions. Other solutions having from 0 to about 30 weight percent ammonium chloride, from 0 to about 55 weight percent ammonium sulfate and from about 65 to 0 weight percent ammonium nitrate can be applied to the foliage in accordance with my invention.

When the crop for harvesting comprises a cellulose product such as cotton, slight amounts of phosphates, preferably ammonium phosphates, can be incorporated into the solution to impart a flame proofing to the cellulose. Examples of suitable phosphates are mono- and di-ammonium orthophosphates, ammonium pyrophosphate, ammonium tripolyphosphate, etc. The amount of ammonium phosphate can be from about 1 to about 15 weight percent and preferably from about 5 to about 12 weight percent.

Preferably a surface active agent is added to the ammonium salt solutions to improve its effect. The agent can be used in an amount from 0.1 to about 5; preferably from 0.5 to 2 weight percent. I have found that the presence of the surface active agent achieves a more uniform and consistent effect. In general, any surface active agent can be used such as the cationic, anionic and non-ionic types.

Examples of the cationic surfactants include: fatty amines, e.g., dodecylamine, octadecylamine (Armeens, Duomeens of Armour Chemical Company); alkarylamines, e.g., dodecyl aniline, fatty amides such as fatty imidazolines, e.g., undecylimidazoline prepared by condensing lauric acid with ethylene diamine or oleylaminodiethylamine prepared by condensing oleic acid with asymmetric diethylene diamine (Sapamine CH by Ciba); quaternary alkyl and aryl ammonium salts and hydrates, e.g., cetyltriethyl ammonium cetyl sulfate, dimethylbenzyldodecyl ammonium chloride, etc.; quaternary ammonium bases of fatty amides of disubstituted diamines, e.g., oleyl methylaminoethylene diethylamine methyl sulfate (Sapamine MS by Ciba), oleylbenzylamino ethylene diethylamine hydrochloride (Sapamine BCH by Ciba); fatty derivatives of benzimidazolines such as are prepared by condensation of a fatty acid with orthophenylenediamine followed by alkylation of the condensate with an alkyl halide to yield an N-alkyl alkylbenzimidazole, e.g., N-methyl N'N' diethyl heptadecylbenzimidazole; N-fatty alkyl pyridinium compounds, e.g., lauryl pyridinidum, octadecyl pyridinium (Fixanol of Imperical Chemical Industries), octadecyl methylene pyridinium acetate; etc.

Examples of useful anionic surface active agents include the following: fatty acid glyceride sulfonates and fatty acid sulfonates, e.g., sulfonated cottonseed oil, sulfonated oleic acid, sulfonated sperm oil, sulfonated tallow, etc.; sulfonated fatty amides, e.g., sulfonated amide of ricinoleic acid (Humectol CA by I. G. Farben), sodium salt of sulfuric ester of oleyl diisobutyl amide (Dismulgen V of I. G. Farben), etc.; sulfonated anilides of fats, e.g., sodium salt of sulfuric ester of oleylethyl anilide (Humectol CX by I. G. Farben), etc.; amides of aminosulfonic acids, e.g., sodium sulfonate of oleylmethyl tauride (Igepon T by I. G. Farben); amides from condensation of fatty acid chlorides with amino acids, e.g., sodium salt of oleyl sarcoside (Medialan A by I. G. Farben); sulfonated aromatic hydrocarbons, e.g., benzene sulfonic, naphthalene sulfonic acids and their ammonium and alkali metal salts, etc.; alkylaryl sulfonates, e.g., dodecylbenzene sulfonates, octadecylbenzene sulfonates, etc.

Illustrative non-ionic compounds include the polyethylene oxide condensates with hydrophobic groups having a reactive hydrogen. The hydrophobic group can have from about 10 to 25 carbon atoms and from 2 to about 15 molecular weights of ethylene oxide are commonly condensed per molecular weight of hydrophobic group. The hydrophobic group can be selected from a variety of organic compounds having one or more reactive hydrogens including fatty alkyl or alkenyl alcohols, fatty acids, fatty amines, fatty amide, esterified hexitans or alkyl or alkenyl phenols.

As described, the source of the hydrophilic group is ethylene oxide. Other source materials can be employed, for example, ethylene chlorohydrin, or polyethylene glycol; however, because of its low cost and availability, ethylene oxide is used almost exclusively in the preparation of these materials.

As previously mentioned, the hydrophobic reactant can comprise an alkyl or alkenyl phenol wherein the alkyl or alkenyl group or groups contain between about 2 and about 16 carbon atoms. Among such compounds are the following: hexyl phenol, hexenyl phenol, hexadecyl phenol, dodecenyl phenols, tetradecyl phenol, heptenyl cresol, octyl and octenyl cresol, lauryl cresol, isoamyl cresol, decyl resorcinol, cetenyl resorcinol, isododecyl phenol, decenyl xylenol, etc. Examples of commercially available wetting agents belonging to this class are: "Antarax A-201" of the Antara Chemical Company and "Lavacol" of The General Dyestuff Corporation.

A second class of such compounds comprises fatty acids containing between about 8 and about 22 carbon atoms. Examples of such fatty acids are the following: lauric acid, tridecenoic acid, tetradecenoic acid, pentadecanoic acid, palmitic acid, oleic acid, nonadecanoic acid, docosanoic acid, etc. Examples of commercially available wetting agents having a fatty acid constituent and containing ethylene oxide are the following: "Ninosol 100," "Ninosol 200" and "Ninosol 210" of The Alrose Chemical Company, and "Nopalcol 4-D" of the Nopco Chemical Company.

A third class of hydrophobic reactants comprises the alkyl and alkenyl alcohols containing between about 8 and about 22 carbon atoms. Among such alcohols are dodecanol, tridecanol, tetradecanol, pentadecanol, hexadecanol, heptadecanol, octadecenol, docosenol, etc. A commercially available wetting agent of this type and containing ethylene oxide is Brij 30 of The Atlas Powder Company.

A fourth class of the hydrophobic reactants comprises long chain alkyl or alkenyl amines or amides containing between about 8 and about 22 carbon atoms. These compounds contain two reactive hydrogens and the polyethylene oxide units are distributed therebetween. Examples of such compounds are dodecanamide, tridecyl amine, tetradecenamide, pentenyl amine, hexadecyl amine, heptadecanamide, octadecyl amine, oleic amide, etc. Examples of commercially available wetting agents in this group containing ethylene oxide and "Ethomide" of The Armour Chemical Company and "Priminox 10" of the Rohm and Haas Chemical Company.

Another class of suitable wetting agents are the reaction products of ethylene oxide with fatty acid partial esters of hexitans. Such compounds are obtained by treating a hexitol, e.g., sorbitol, mannitol, dulcitol, etc., with a dehydrating agent to form the corresponding hexitan, i.e., sorbitan, mannitan, dulcitan, etc. The hexitan is then partially esterified with a long chain fatty acid having between about 8 and about 22 carbon atoms, such as dodecanoic acid, pentadecenoic acid, hexadecanoic acid, oleic acid, stearic acid, etc., to replace one of the reactive hydrogens of the hexitan with the carboxylic radical. The resultant partial ester is then reacted with ethylene oxide. Commercially available compounds of this type are "Tween 65" and "Tween 81" of The Atlas Powder Company.

Very suitable emulsifiers comprise the organic substituted ammonium salts of sulfodicarboxylic acids that are reacted with various hydrophobic groups such as fatty amides having 12 to 18 carbons to prepare half amides in the manner described in 2,976,209, or with fatty amines having 12 to 26 carbons to prepare half amides in the manner described in 2,976,211, or with polyethoxylated fatty amines in the manner described in 3,080,280, or with fatty acid esters of hydroxyl amines to obtain half amides in the manner described in 2,976,208.

A preferred emulsifier comprises the amine salts of a sulfodicarboxylic acid half ester of an alkylphenoxy ethoxy alcohol. These emulsifiers have the following structure:

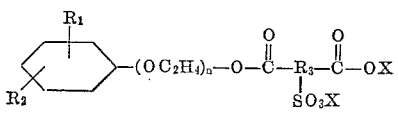

wherein:

$R_1$ is selected from the class consisting of alkyl and alkenyl groups;
$R_2$ is selected from the class consisting of hydrogen, alkyl and alkenyl groups;
$R_3$ is selected from the group consisting of divalent sulfoalkylene and sulfo-alkenylene groups;
X is an organic alkyl, aryl and hetercyclic amine cation having from 1 to about 6 carbon atoms;
n is an integer between about 2 and about 5;
and the total of carbons in any $R_1$, $R_2$, $R_3$ group is less than about 12; and preferably less than about 6.

Examples of suitable radicals from which $R_1$ and $R_2$ can be selected are the following: methyl, ethyl, propyl, isopropyl, butenyl, isobutyl, amyl, isoamyl, heptenyl, isoheptenyl, octyl, isooctenyl, nonyl, isononyl, decenyl, isodecyl, undecyl, isoundecenyl, dodecyl, isododecyl, etc.

Examples of various $R_3$ groups are the following: methylene, ethylene, propylene, isopropylene, butylene, isobutylene, pentylene, isopentylene, hexylene, isohexylene, etc.

Various organic amine cations can be used for X such as the primary, secondary and tertiary alkyl, alkaryl and aryl amines as well as heterocyclic compounds containing a basic nitrogen. Examples of suitable amines are the following: methylamine, dimethylamine, ethylamine, triethylamine, diethyl benzyl amine, propylamine, isopropylamine, diisopropylamine, ethylpropylamine, butylamine, isobutylamine, diisoamylamine, hexylamine, heptylamine, isocetylamine, furanamine, benzylamine, morpholine, pyridine, etc. Preferred are the alkylamines having between 1 and about 6 carbons, e.g., isopropylamine.

Examples of various compounds useful as emulsifiers in my invention are the following: half isobutyl amine salt, half tetraethoxy xylenol ester of sulfo-gluteric acid; half isopropyl amine salt, half triethoxy amyl phenol ester of sulfo-adipic acid; half amyl amine salt, half pentaethoxy cresol ester of sulfo-pimalic acid; half hexylamine salt, half diethoxyoctyl phenol ester of sulfo-suberic acid; half isopropylamine salt, half diethoxy dodecyl phenol ester of sulfo-azelaic acid; half helptylamine salt, half diethoxy dodecyl phenol ester of sulfo-sebasic acid, etc.

Of the aforedescribed emulsifier compounds, the most preferred are those in which the total of carbons in any $R_1$, $R_2$ or $R_3$ group is less than 4 and the number of carbons in the $R_3$ group is 2 or 3. In this most preferred group, n preferably equals two.

The aforementioned emulsifiers are readily prepared by reacting at about 100° C. an unsaturated acid anhydride, e.g., maleic anhydride with a hydrophobic group comprising polyethylene oxide condensate or an alkylphenol. The resultant half ester is then reacted with an organic amine to prepare the salt which is reacted in an alcohol or aqueous media at 60°–85° C. with an amine bisulfide to add the amine sulfonate group to the olefinic bond of the dicarboxylic acid. The aforementioned emulsifiers are also available from the Witco Chemical Company under Emcol H2A designation.

The invention can be applied to a wide variety of crops to facilitate their harvesting such as cotton, potatoes, sugar beets, sugar cane, peppers, milo, roses, alfalfa, pineapple, tomatoes, grapes, etc.

The following will illustrate compositions that can be used in accordance with my invention to provide a premature leaf necrosis and/or abscission:

Composition 1
| | Weight percent |
|---|---|
| Ammonium nitrate | 70 |
| Formamide | 5 |
| Emcol H2A | 1 |

Composition 2
| | |
|---|---|
| Ammonium nitrate | 50 |
| Ammonium chloride | 15 |
| N,N-dimethylformamide | 10 |
| Sapamine CH | 0.5 |

Composition 3
| | |
|---|---|
| Ammonium sulfate | 12 |
| Ammonium nitrate | 60 |
| N,N-diphenylformamide | 5 |
| Medialan A | 3 |

Composition 4
| | |
|---|---|
| Ammonium nitrate | 45 |
| N,N-diisopropylformamide | 30 |
| Ethomide | 7 |

Composition 5
| | |
|---|---|
| Ammonium nitrate | 35 |
| Ammonium sulfate | 8 |
| Formamide | 35 |
| Tween 81 | 5 |

Composition 6
| | |
|---|---|
| Ammonium nitrate | 30 |
| Formamide | 50 |
| Emcol H2A | 3 |

Composition 7
| | |
|---|---|
| Ammonium nitrate | 57 |
| N-amylformamide | 5 |
| Priminox 10 | 2 |

The following example will illustrate a mode of practice of my invention:

Example 1.—The test solutions were applied to a plot of cotton plants varying in height from approximately 30 to 48 inches. The cotton was of harvesting maturity at the time of application of the solutions which were sprayed from a hand-pushed rig equipped with five 65° T-jet noozles. The rig had upright standards and an overhead yoke that straddled the cotton row and the five nozzles were placed on the rig to direct their spray to the center thereby forming a five-pointed star spray pattern about the cotton plants.

The test solutions applied at a rate of 10 and 20 gallons per cotton acre and the cotton was observed for combined defoliation and desiccation after 24 hours and after 1 week. The following data were obtained from a test of ammonium nitrate, ammonium nitrate plus the preferred emulsifier and ammonium nitrate with formamide:

| Solution | Application rate (gal./acre) | Percent effectiveness 24 hours | Percent effectiveness 1 week |
|---|---|---|---|
| 1 ____ 57 percent ammonium nitrate | 10 | 50 | 40 |
| 2 _____do_____ | 20 | 80 | 80 |
| 3 ____ 57 percent ammonium nitrate 0.5 percent Emcol H2A | 10 | 20 | 50 |
| 4 _____do_____ | 20 | 80 | 80 |
| 5 ____ 45 percent ammonium nitrate 0.5 percent Emcol H2A 21 percent formamide | 10 | 60 | 60 |
| | 20 | 80 | 80 |

The preceding illustrates a mode of practice of my invention and demonstrates the results obtainable thereby and, in particular, shows that the use of formamide increases the consistency of the ammonium nitrate as a leaf desiccant and permits greater than 50 percent effectiveness even when applied at the low rate of 10 gallons per acre (45 pounds of solute per acre). The presence of the formamide also greatly increased the rate of desiccation for the low application rate and permitted the solution to complete its effect within 24 hours, thereby permitting faster crop harvesting.

The preceding example and illustrative examples are intended solely to illustrate my invention and to set forth a mode of practice thereof. It is not intended that the preceding exemplification be construed as unduly limiting of the invention, but rather, that the invention be defined by the steps and ingredients, and their obvious equivalents, set forth in the following claims.

I claim:

1. The method of facilitating the harvest of mature plants which comprises applying an aqueous salt composition to said plants at a dosage greater than about 35 pounds of said salt per acre, said solution comprising (a) water containing at least about 15 weight percent of an ammonium salt selected from the class consisting of ammonium nitrate, ammonium chloride, ammonium sulfate and mixtures thereof and (b) from 5 to 50 weight percent of a compound having the following structure:

wherein $R_1$ and $R_2$ are selected from the class consisting of hydrogen, alkyl and phenyl radicals and the total carbons in each of said $R_1$ and $R_2$ groups does not exceed about 10.

2. The method of claim 1 wherein said solution also contains a surface active agent.

3. The method of claim 1 wherein said solution contains between 20 and about 65 weight percent ammonium nitrate.

4. The method of claim 1 wherein said solution contains a mixture of ammonium nitrate and ammonium chloride.

5. The method of claim 1 wherein said compound is formamide.

6. The method of desiccating leaf tissue of mature plants which comprises spraying onto said plants an aqueous solution of: (a) an ammonium salt having a concentration of at least about 15 weight percent and selected from the class consisting of ammonium nitrate, ammonium chloride, ammonium sulfate and mixtures thereof and (b) from 5 to 50 weight percent of a compound having the following structure:

wherein $R_1$ and $R_2$ are selected from the class consisting of hydrogen, alkyl and phenyl radicals and the total carbons in each of said $R_1$ and $R_2$ groups does not exceed about 10.

7. The method of claim 6 wherein said solution also contains between about 0.1 and 5.0 weight percent of a surface active agent.

References Cited

UNITED STATES PATENTS 3,070,433  12/1962  Schlor et al. _____ 71—2.7
3,152,879  10/1964  Yale _____ 71—2.2

JAMES O. THOMAS, JR., *Primary Examiner.*